United States Patent
Ince et al.

(10) Patent No.: US 10,036,429 B2
(45) Date of Patent: Jul. 31, 2018

(54) WEDGE CLUTCH WITH TAPERED PROFILE AND CAGE

(71) Applicant: SCHAEFFLER TECHNOLOGIES AG & CO. KG, Herzogenaurach (DE)

(72) Inventors: Marion Jack Ince, Mount Holly, NC (US); Guihui Zhong, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/388,395

(22) Filed: Dec. 22, 2016

(65) Prior Publication Data

US 2018/0180107 A1    Jun. 28, 2018

(51) Int. Cl.
| | |
|---|---|
| *F16D 13/10* | (2006.01) |
| *F16D 13/64* | (2006.01) |
| *F16D 13/66* | (2006.01) |
| *F16D 13/68* | (2006.01) |

(52) U.S. Cl.
CPC ........... *F16D 13/10* (2013.01); *F16D 13/644* (2013.01); *F16D 13/66* (2013.01); *F16D 13/68* (2013.01)

(58) Field of Classification Search
CPC .. F16H 57/0473; F16H 47/02; F16H 57/0402; B60K 17/344; F16D 2300/0214; F16D 2300/06
See application file for complete search history.

(56) References Cited

U.S. PATENT DOCUMENTS

| | | | | |
|---|---|---|---|---|
| 710,685 | A * | 10/1902 | Harris ..................... | F16D 13/64 192/52.3 |
| 9,644,690 | B2 * | 5/2017 | Lee .......................... | F16D 43/00 |
| 2003/0019708 | A1 * | 1/2003 | Goto ....................... | F16D 27/02 192/35 |
| 2008/0060877 | A1 * | 3/2008 | Klose ...................... | F16D 23/06 184/6.12 |
| 2015/0014113 | A1 | 1/2015 | Ohr et al. | |
| 2015/0083539 | A1 | 3/2015 | Lee et al. | |
| 2015/0152921 | A1 | 6/2015 | Lee | |
| 2016/0084326 | A1 | 3/2016 | Ramsey | |

OTHER PUBLICATIONS

Brian Lee; AWD Disconnect—Escaping the clutches of the dog; Schaeffler Symposium; 2014; pp. 1-27.

* cited by examiner

*Primary Examiner* — David J Hlavka
(74) *Attorney, Agent, or Firm* — Brooks Kushman P.C.

(57) ABSTRACT

A wedge clutch imparts a wedging effect to selectively transfer power through powertrain components. The wedge clutch includes a hub configured to rotate about an axis and having a tapered hub surface. A rotatable member is configured to rotate about the axis. A plurality of wedge segments are arranged annularly about the axis and are disposed radially between the hub and the rotatable member. The wedge segments can collectively radially expand and contract to lock and unlock the clutch. Each wedge segment defines an aperture therethrough. A cage assembly includes a plurality of pins that each extend through a respective one of the apertures to control relative radial movement of the wedge segments.

20 Claims, 5 Drawing Sheets

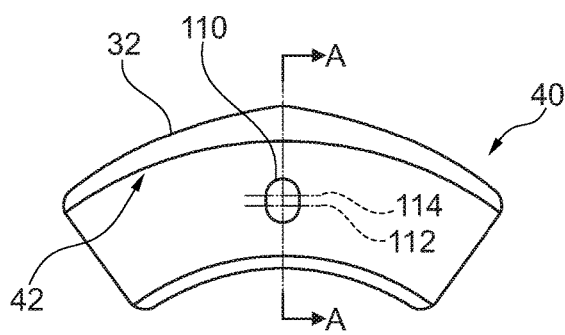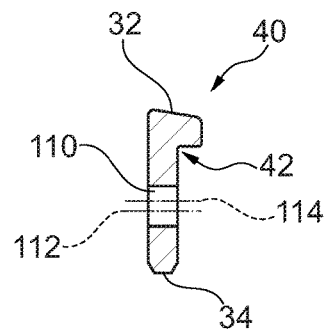
Fig. 2A    Fig. 2B
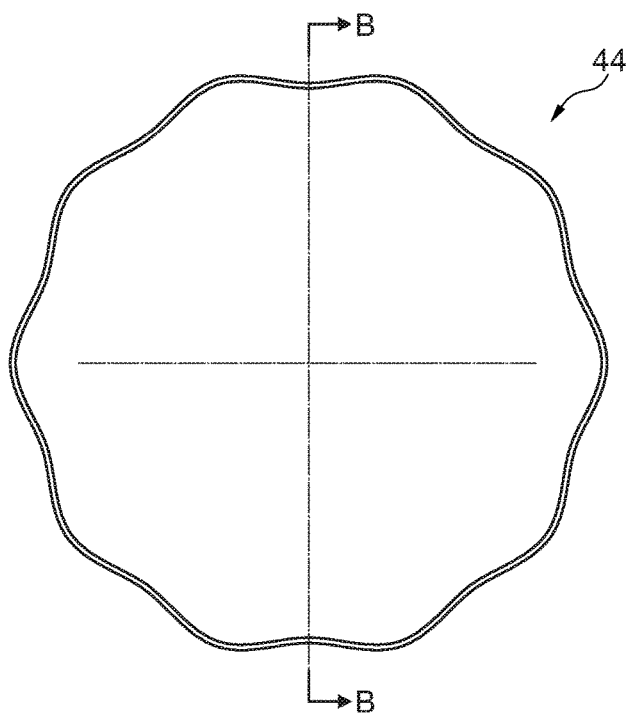
Fig. 3A    Fig. 3B

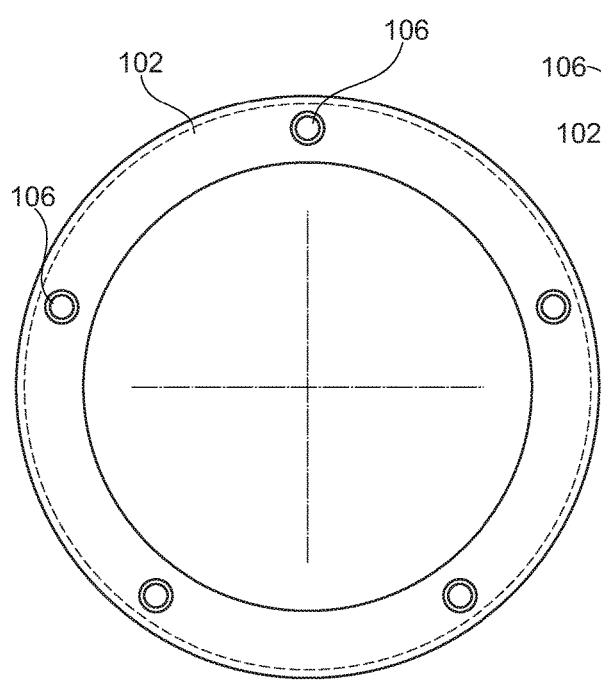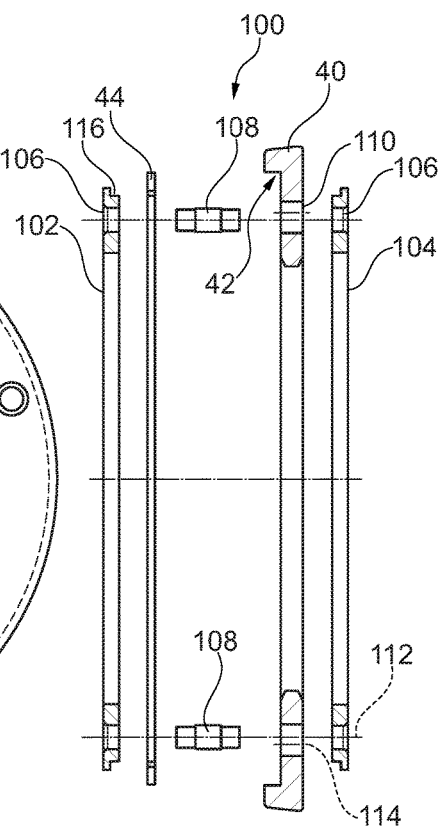
Fig. 4A
Fig. 4B

WEDGE CLUTCH WITH TAPERED PROFILE AND CAGE

TECHNICAL FIELD

The present disclosure relates to a wedge clutch for selectively coupling two or more powertrain components to each other.

BACKGROUND

In a motor vehicle, a four-wheel drive system or an all-wheel drive system can be selectively activated by a clutch. The clutch can be part of a power transfer unit for connecting a power source to a secondary drive shaft when it is desired to deliver power to the secondary drive shaft. It is known that such a clutch can be a dog clutch. Dog clutches are prone to teeth clash or blocking. It is also known that such a clutch can be a wet clutch in a differential. Pressurized fluid must be continuously supplied to keep the clutches in a closed mode, adding to the power usage associated with usage of the clutch. Wedge clutches are known, such as those described in U.S. Patent Publication Numbers 2015/0083539, 2015/0014113, and 2015/0152921.

SUMMARY

According to one embodiment, a wedge clutch includes a hub configured to rotate about an axis and having a tapered hub surface. A rotatable member is configured to rotate about the axis. A plurality of wedge segments are arranged annularly about the axis and are disposed radially between the hub and the rotatable member. Each wedge segment defines an aperture therethrough. A cage assembly includes a plurality of pins that each extend through a respective one of the apertures to control relative radial movement of the wedge segments.

The cage assembly may include first and second washers arranged about the axis and spaced from one another. Each pin may extend into or be fixed to (e.g., riveted, welded, etc.) the first and second washers.

An annular spring may be disposed axially between the plurality of wedge segments and one of the washers. The spring may have a continuous wavy profile to facilitate a distribution of biasing force onto the wedge segments.

Axial movement of the hub along the axis can slide the tapered hub surface along the wedge segments to expand and contract the wedge segments radially to frictionally engage and disengage the wedge segments with the rotatable member.

In one embodiment, the tapered hub surface faces away from the axis, the rotatable member has a groove facing toward the axis, and the axial movement of the hub forces the wedge segments radially outward to engage with the groove and lock the clutch. In another embodiment, the tapered hub surface faces toward the axis, the rotatable member has a groove facing away the axis, and the axial movement of the hub forces the wedge segments radially inward to engage with the groove and lock the clutch.

According to another embodiment, a wedge clutch includes an outer race arranged about an axis and having an inner surface. An inner race has an outer surface that faces the inner surface of the outer race. A plurality of wedge segments are disposed about the axis and radially between the inner and outer surfaces. Relative axial movement between the outer surface and the inner surface moves the wedge segments radially into engagement and disengagement with one of the inner and outer surfaces to lock and unlock the clutch. A cage assembly is connected to each of the wedge segments to control radial movement of the wedge segments.

The cage assembly may have a plurality of pins that each extend through one aperture of one of the wedge segments. The apertures may have an oblong profile and the pins may have a cylindrical portion extending through the apertures such that relative movement of the wedge segments is controlled by the apertures about the pins.

According to yet another embodiment, a clutch includes a first rotatable member rotatable about an axis and having an inner tapered surface facing the axis. A second rotatable member is rotatable about the axis and has an outer surface facing the inner surface of the first rotatable member. One of the inner surface and the outer surface has a groove defined therein, and the other of the inner surface and the outer surface is a first tapered surface. A plurality of wedge segments are separable from one another. Each wedge segment has a second tapered surface in sliding engagement with the first tapered surface to cause radial movement of the wedge segments. A cage assembly includes a plurality of pins extending through the wedge segments to limit radial movement of the wedge segments.

BRIEF DESCRIPTION OF THE DRAWINGS

FIG. 2A is a plan view of a wedge segment of the wedge clutch of FIG. 1, according to one embodiment.

FIG. 2B is a cross-sectional view of the wedge segment of FIG. 2A taken along line A-A of FIG. 2A.

FIG. 3A is a plan view of a biasing spring with a wavy, continuous profile, according to one embodiment.

FIG. 3B is a cross-sectional view of the spring of FIG. 3A taken along line B-B of FIG. 3A.

FIG. 4A is a front plan view of washer of a cage assembly, according to one embodiment.

FIG. 4B is a cross-sectional view of a cage assembly having two of the washers of FIG. 4A, along with pins for passing through the wedge segments and spring, according to one embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
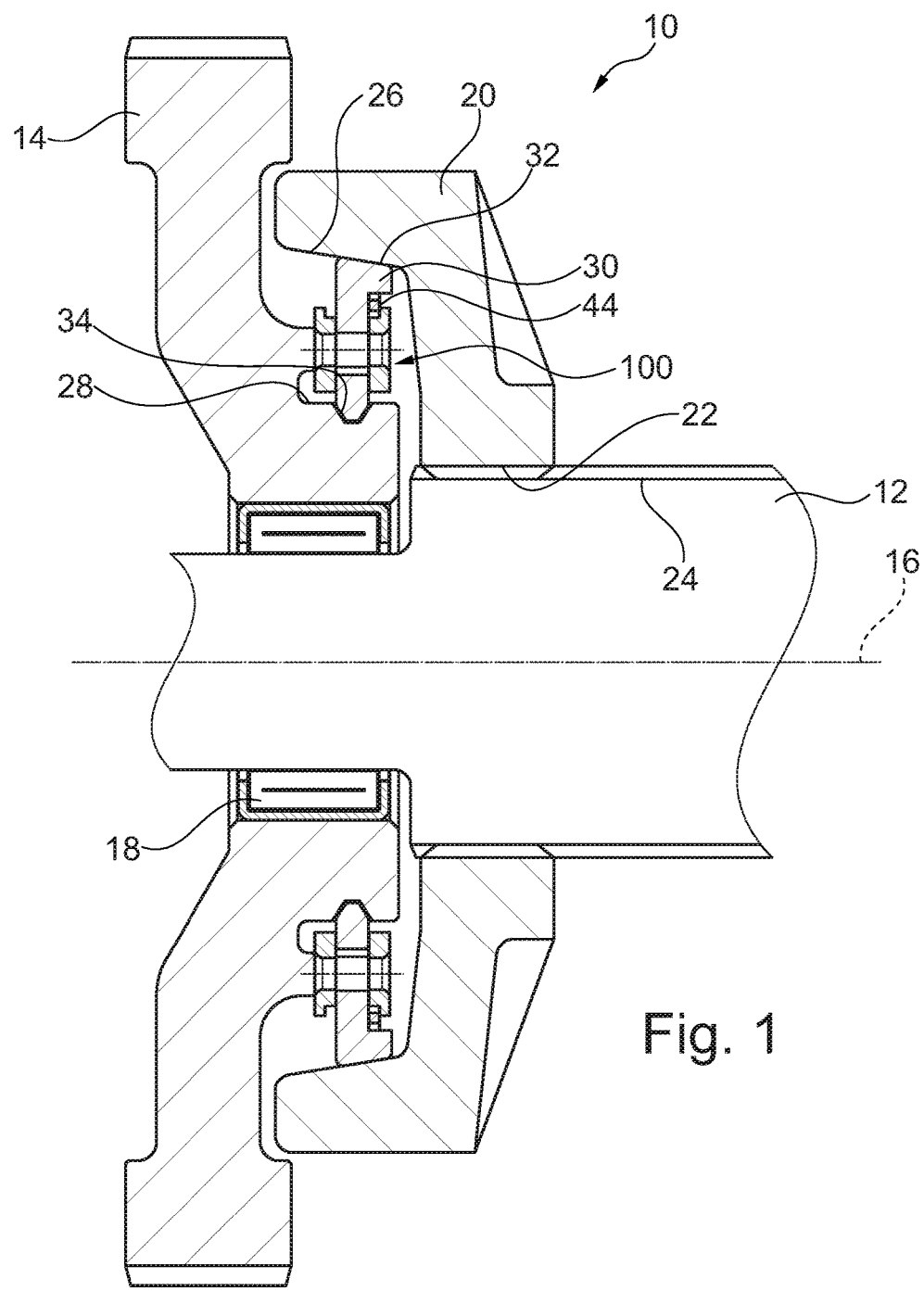
FIG. 1 is a side cross-sectional view of a wedge clutch for selectively coupling an input to an output, according to one embodiment.

Referring to FIG. 1, a portion of a power-transfer unit (PTU) for a powertrain of an automotive vehicle is shown. The PTU may be utilized for selectively activating all-wheel drive or four-wheel drive in the automotive vehicle, for example. To selectively activate the all-wheel drive or four-wheel drive, a wedge clutch 10 is utilized. Details of the structure and operation of the wedge clutch is provided herein. Additional structure and operation of the wedge clutch is provided in the following documents, which are incorporated by reference herein: U.S. patent application Ser. No. 15/388,297, filed on the same day as this disclosure; U.S. patent application Ser. No. 15/388,270, filed on the same day as this disclosure; U.S. patent application Ser. No. 15/388,239, filed on the same day as this disclosure; U.S. patent application Ser. No. 15/388,213, filed on the same day as this disclosure; and U.S. patent application Ser. No. 15/388,292, filed on the same day as this disclosure.

In one embodiment, a shaft 12 acts as an input member to input torque into the wedge clutch 10 from an engine of the vehicle. To activate all-wheel drive or four-wheel drive, the wedge clutch 10 is controlled to close in order to transfer torque from the shaft 12 to an output member 14 (which may be referred to as an inner race or a first race), which is coupled to the all-wheel drive or four-wheel drive system. In one example, the output member 14 is a ring gear with external teeth that engage a corresponding gear of the all-wheel or four-wheel drive system.

Both the shaft 12 and the output member 14 may be supported by a housing for rotation about an axis 16. The output member 14 may be supported for rotation about the axis via bearing 18. When no torque is transmitted to the output member 14, the output member 14 may freely rotate about the shaft via the bearing 18 irrespective of the rotation of the shaft 12. Alternatively, when the wedge clutch 10 is closed to transmit torque to the output member 14, the output member 14 is fixed to rotate with the shaft 12, as will be described below. The output member 14 may be driveably connected to a transmission output shaft. Two components are driveably connected if they are connected by a power flow path that constrains their rotational speeds to be proportional.

The wedge clutch 10 includes a hub 20 (which may be referred to as an outer race or a second race) that is coupled to the shaft 12 via a spline connection, generally shown at 22. For example, the hub 20 may include an inner surface facing the shaft 12 that includes spline surface features that engage with corresponding spline surface features on an outer surface of the shaft 12. While fixing the hub 20 and the shaft 12 radially with respect to one another, the spline connection also enables relative axial movement of the hub 20 relative to the outer surface of the shaft 12.

The hub 20 includes an inner surface 26 that circumferentially extends about the axis 16 and faces the axis 16. Likewise, the output member 14 includes an outer surface 28 that circumferentially extends about the axis 16 and faces the inner surface 26. A wedge plate 30 is disposed between the inner surface 26 and the outer surface 28. The wedge plate 30 may include a group of separable plate segments or disks segments connected together. As will be described below in greater detail, the wedge plate 30 or each individual wedge segment includes an outer surface 32 facing away from the axis 16 that is slideably disposed on the inner surface 26, and an inner surface 34 facing toward the axis 16 that is configured to move into an out of engagement with a groove 50 in the outer surface 28 of the output member 14. When the inner surface 34 of the wedge plate 30 engages the inner, angled surface of the groove 50 of the output member 14, the clutch may be closed and torque may be transmitted through the wedge clutch 10; when the inner surface 34 of the wedge plate 30 is spaced from or disengaged from the groove 50 of the output member 14, the clutch may be open and the torque may not be transmitted through the wedge clutch 10. It should be noted that in one embodiment, the wedge plate 30 and the groove 50 are shaped such that the inner surface 34 of the wedge plate is only able to contact the angled surfaces of the groove 50 but not other portions of the outer surface 28 of the output member 14.

The wedge clutch 10 also includes a cage assembly 100 that contains, locates, and allows equal radial movement of the individual wedge segments of the wedge plate 30. The cage assembly 100 is described in more detail below.

FIGS. 2A-2B show an individual wedge segment 40 (also referred to as a wedge plate segment or disk segment) of the wedge plate 30. The wedge plate 30 includes a plurality of wedge segments 40. In the embodiment illustrated in this disclosure, five wedge plate segments 40 are illustrated, but more or less than five may be included in the wedge plate 30. Each segment 40 includes a shoulder 42 sized to receive an annular spring 44 (also referred to as a retaining ring), which is illustrated in FIG. 3A-3B. The spring 44 couples the wedge segments 40 to one another and is biased with a spring force to press the wedge segments 40 outward against the inner surface 26 of the hub 20 away from the axis 16. The spring 44 has a waved shape, rather than a split body, in order to apply consistent outward radial force amongst the plurality of wedge segments 40.

The outer surface 32 of each wedge segment 40 is tapered. As shown in FIG. 1, the outer surface 32 is tapered inward (e.g., toward the axis 16) as the outer surface 32 extends towards the front of the hub 20. The inner surface 26 of the hub 20 is also tapered to match the profile of the tapered outer surface 32 of the wedge plate. This facilitates sliding of the outer surface 32 of the wedge plate 30 along the inner surface 26 of the hub 20. As will be described in further detail below, sliding of the hub 20 in one direction (e.g., to the left as viewed in FIG. 1) along the wedge plate 30 compresses the wedge segments 40 inward to engage with the outer surface 28 of the output member 14 to lock the clutch 10; sliding of the hub 20 in the other direction (e.g., to the right as viewed in FIG. 1) along the wedge plate 30 enables the spring 44 to press the wedge segments 40 outward and away from the outer surface 28 of the output member 14 to unlock the clutch 10.

FIGS. 2A and 2B also illustrate an aperture 110 that receives a pin 108 of a cage assembly 100, as will be described in further detail below. The aperture 110 is oblong or oval in shape with a pair of focus points, each having a respective planes or axes passing through. One of the axes 112 is located radially inward from the other axis 114.

As mentioned briefly above, the wedge clutch 10 also includes a cage assembly 100 that contains, locates, and allows equal radial movement of the individual wedge segments of the wedge plate 30. FIGS. 4A and 4B show the cage assembly 100 in isolation and including the spring 44. The cage assembly 100 includes a pair of outer washer flanges 102, 104. The outer washer flanges 102, 104 are washer-shaped (e.g., annular or ring-shaped). Each outer washer flange 102, 104 includes a plurality of apertures 106 arranged annularly about the central axis. The outer washer flanges 102, 104 are connected to each other in a spaced-apart relationship by a plurality of pins 108, with each pin 108 extending into a pair of aligned apertures 106 of the washer flange 102, 104. The washer flanges 102, 104 may be fastened together by the pins 108, which may be riveted, staked, welded, or fastened by other means. Each pin 108 also extends through an aperture 110 provided in each wedge segment 40. Two apertures 106, one pin 108, and the aperture 110 are all aligned along an axis 112.

As will be described below, according to one embodiment the aperture 110 has an inner diameter that exceeds the outer diameter of the pin 108 to allow the associated wedge plate segment 40 to move relative to the pin 108 between two different positions when the clutch is locked and unlocked. For example, when the clutch is unlocked, the axis 112 is aligned with a portion of the pin 108. When the clutch is locked, the wedge plate segments have moved such that the secondary axis 114 is aligned with the same portion of the pin 108.

The outer washer flanges 102, 104 may also be provided with a shoulder 116. The shoulder 116 has a surface facing inward to the spring 44 to constrain the spring 44 within the cage assembly 100. When the cage assembly 100 is assembled, the spring 44 is fit axially between the wedge segments 40 and the shoulder 116 of one of the outer washer flanges 102. The spring is also fit radially between the shoulder 116 of the outer washer flange 102 and the shoulder 42 of the wedge segment 40.

Figure 5:
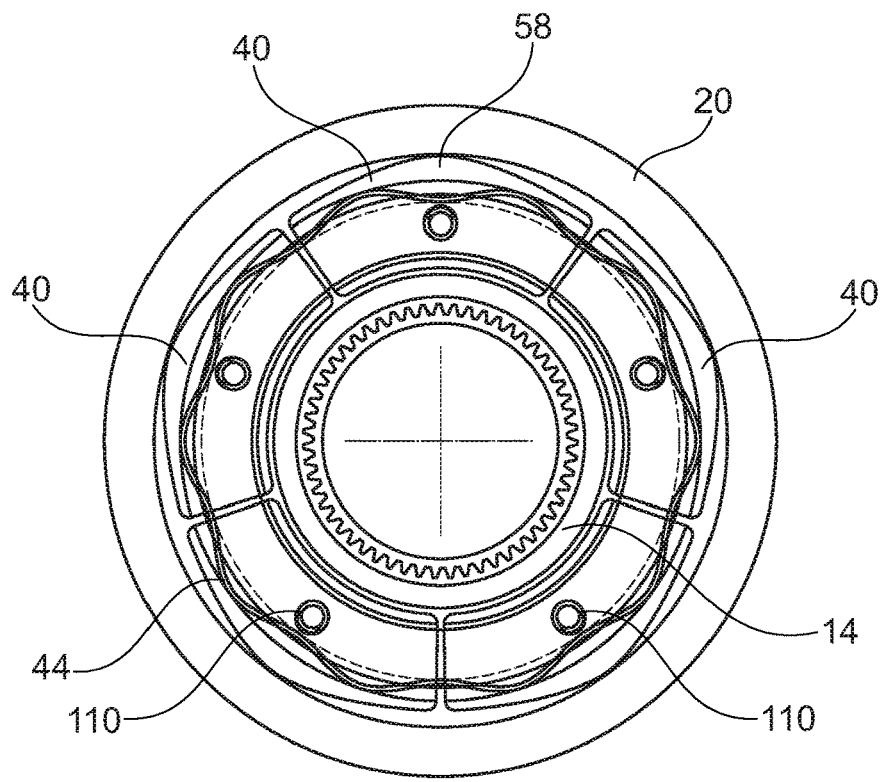
FIG. 5 is a front view of the wedge clutch in an unlocked position, according to one embodiment.
Figure 6:
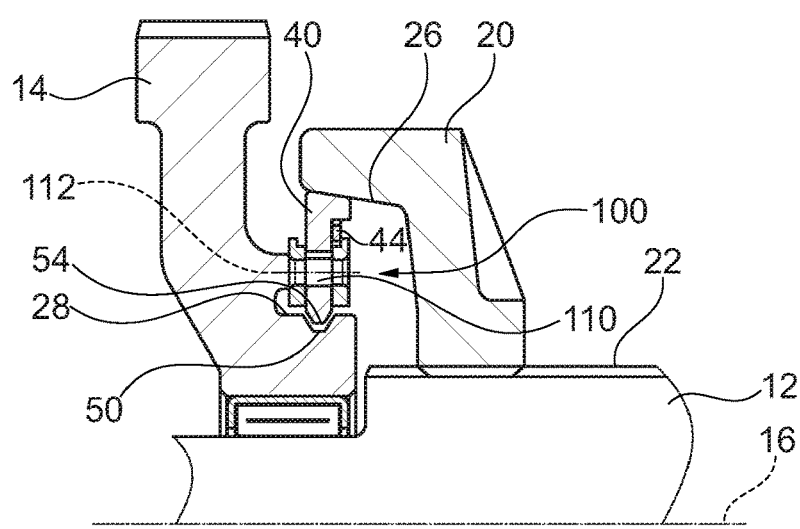
FIG. 6 is a side cross-sectional view of the wedge clutch in the unlocked position, according to one embodiment.
Figure 7:
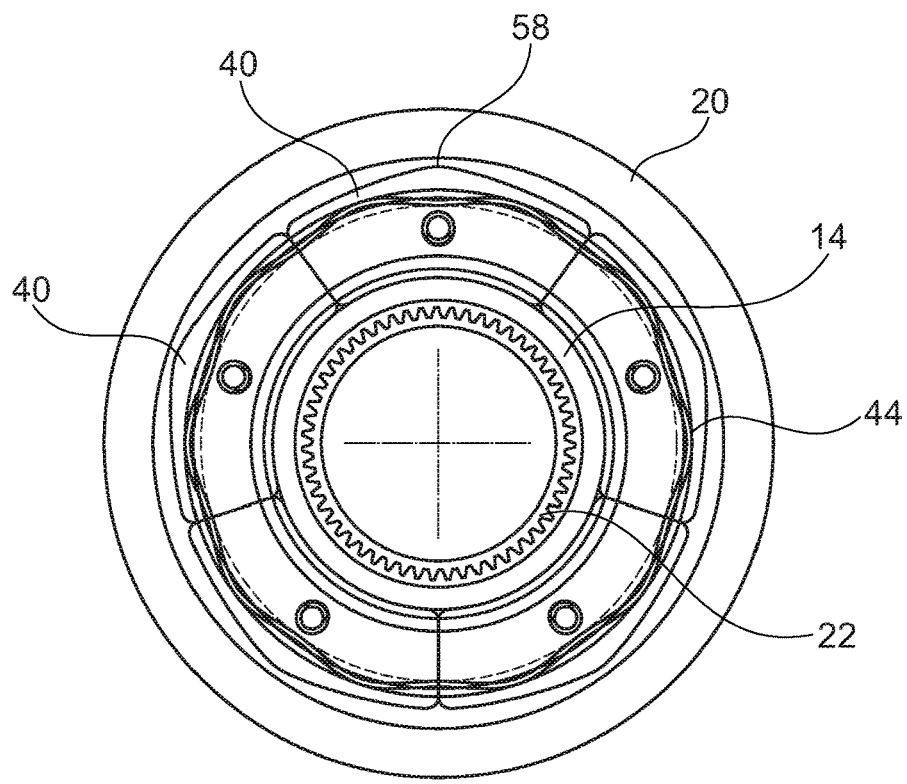
FIG. 7 is a front view of the wedge clutch in a locked position, according to one embodiment.
Figure 8:
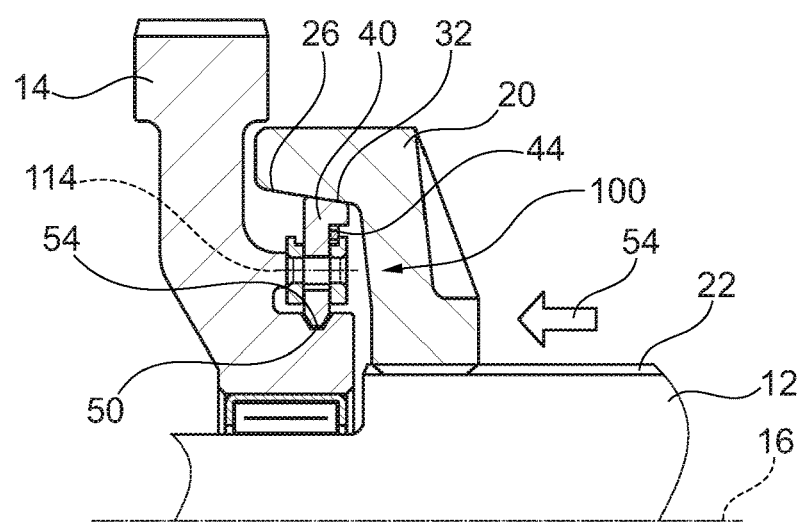
FIG. 8 is a side cross-sectional view of the wedge clutch in the locked position, according to one embodiment.

Locking and unlocking of the wedge clutch 10 will now be described with reference to FIGS. 5-8, which include the structure described above and shown in FIGS. 1-4B. FIGS. 5 and 6 show the clutch 10 in its unlocked position in which torque or power does not transmit to the output member 14. FIGS. 7 and 8 show the clutch 10 in its locked position in which torque or power is able to transmit from the shaft 12 to the output member 14.

In the unlocked position illustrated in FIGS. 5 and 6, the hub 20 is disposed along the shaft 12 at a first linear position separated from the output member 14 by a first linear distance. The wedge segments 40 are radially expanded outward from the axis 16 via a biasing force from the spring 44. The biasing of the spring 44 causes the outer surface 32 of the wedge segments 40 to press against the inner surface 26 of the hub 20, and away from the outer surface 28 of the output member 14. The outer surface 28 of the output member 14 may be on a shoulder having a groove 50 defined therein. The groove 50 may be tapered or otherwise shaped to match the shape of the inner surface 34 of the wedge segments 40. In the unlocked position, the inner surface 34 of the wedge segments 40 is spaced from the groove 50, thereby preventing torque from transmitting from the hub 20 to the output member 14 via the wedge plate 30.

While in the locked position, the cage assembly 100 and spring 44 maintain consistent and even alignment between the wedge segments 40. As seen in FIG. 6, the pin 108 is disposed toward the inner side of the aperture 110 of the wedge segment 40 (e.g., along axis 112).

In the locked position illustrated in FIGS. 7 and 8, the hub 20 is translated to be disposed along the shaft 12 at a second linear position separated from the output member 14 by a second linear distance less than the first linear distance. From the perspective of the views of FIGS. 7 and 8, the hub 20 has moved toward the left. This can be accomplished by an actuator (e.g., electromechanical) that provides an actuation force, or by rotating the shaft 12 circumferentially with respect to the hub 20. These and other embodiments for forcing the hub 20 along the shaft 12 can be represented by a force arrow 54, which translates the hub 20 along the spline connection (e.g., to the left). This movement of the hub 20 causes the tapered outer surface 32 of the wedge segments 40 to slide along the tapered inner surface 26 of the hub 20, thereby compressing the wedge segments 40 inward toward the axis 16. The wedge segments 40 being compressed inward can cause the spring 44 to also compress or constrict. Furthermore, the wedge segments 40 may touch one another along their side surfaces, or at least be closer to one another than when in the unlocked position.

When the hub 20 has moved a sufficient distance along the shaft 12, the inner surface 34 of the wedge segments 40 is pressed radially inward into and against the groove 50 of the output member 14. This allows torque or power to be transferred from the wedge segments 40 to the output member 14 at the interface of the inner surface 34 and the groove 50. The transfer of torque to the output member 14 causes the output member 14 to increase in speed to match that of the hub 20. Once the speeds of the output member 14 and the hub 20 are matched, the clutch is considered to be locked.

When in the locked position, the pin 108 is disposed toward the outer side of the aperture 110 of the wedge segment 40 (e.g., along axis 114), as can be seen in FIG. 8.

The outer surface 32 of each wedge segment 40 may also be provided with a cam surface 58 with an apex. This cam surface 58 engages with a corresponding cam receptacle formed in the inner surface 26 of the hub 20. When in the locked position, each cam surface 58 is wedged within a respective cam receptacle. This inhibits rotation of the wedge plates with respect to the hub when the wedge plate is locked. The inner surface 26 of the hub 20 removes lash from the wedge clutch system and the cam surface 58 creates a wedge effect to lock or couple the powertrain components to transfer power.

The cage assembly 100 provides relatively alignment and spacing between the wedge segments 40 while transitioning between locked and unlocked states. With the tapered hub surface 26, the continuous radial wave spring 44, and the equal wedge segments 40 movement controlled radially by the pins 108, optimum equal locking force is applied to engage the shaft 12 with the output member 14.

The wedge clutch described in the various embodiments above is designed to combat centrifugal force. More specifically, implementing a taper on the outer surface of the wedge plate and the groove on the outer surface of the hub (as opposed to having a taper on the inner surface of the wedge plate and the groove on an inner surface of the hub) can inhibit unintentional lock-up which could otherwise be caused by centrifugal force of the spinning components forcing the wedge plate outward into engagement with the groove. The retainer ring is biased to press the wedge segments radially outward even without the presence of a centrifugal force.

The wedge clutch described in the various embodiments also improves torque capabilities. Having the taper on the inner surface (as opposed to the outer surface) of the wedge plate has a potential to limit torque capabilities due to the inner surface of the wedge segments being an area of high stress. Moving the taper to the outer surface of the wedge segments creates a larger circumference and surface area of engagement between the wedge segments and the groove, making it possible to carry higher torque under the same contact force at the same stress level.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A wedge clutch comprising:
   a hub configured to rotate about an axis and having a tapered hub surface;
   a rotatable member configured to rotate about the axis;
   a plurality of wedge segments circumferentially separable from one another and arranged annularly about the axis and disposed radially between the hub and the rotatable member, each wedge segment defining an aperture extending entirely therethrough; and
   a cage assembly including a plurality of pins each extending through a respective one of the apertures to control relative radial movement of the wedge segments.

2. The wedge clutch of claim 1, wherein the cage assembly includes first and second washers arranged about the axis and spaced from one another.

3. The wedge clutch of claim 2, wherein each pin is fixed to the first and second washers.

4. The wedge clutch of claim 2, further comprising an annular spring about the axis and configured to bias the wedge segments radially.

5. The wedge clutch of claim 4, wherein the spring is disposed axially between the plurality of wedge segments and one of the washers.

6. The wedge clutch of claim 4, wherein the spring has a continuous wavy profile to facilitate a distribution of a biasing force onto the wedge segments.

7. The wedge clutch of claim 1, wherein axial movement of the hub along the axis slides the tapered hub surface along the wedge segments to expand and contract the wedge segments radially to frictionally engage and disengage the wedge segments with the rotatable member.

8. The wedge clutch of claim 1, wherein the tapered hub surface faces away from the axis, the rotatable member has a groove facing toward the axis, and the axial movement of the hub forces the wedge segments radially outward to engage with the groove and lock the clutch.

9. The wedge clutch of claim 1, wherein the tapered hub surface faces toward the axis, the rotatable member has a groove facing away the axis, and the axial movement of the hub forces the wedge segments radially inward to engage with the groove and lock the clutch.

10. A wedge clutch comprising:
    an outer race arranged about an axis and having an inner surface;
    an inner race having an outer surface facing the inner surface of the outer race;
    a plurality of wedge segments separable from one another, disposed about the axis and radially between the inner and outer surfaces, wherein relative axial movement between the outer surface and the inner surface moves the wedge segments radially into engagement and disengagement with one of the inner and outer surfaces to lock and unlock the clutch; and
    a cage assembly connected to each of the wedge segments to guide radial movement of the wedge segments.

11. The wedge clutch of claim 10, wherein the cage assembly includes a plurality of pins, each pin extending through one of the wedge segments.

12. The wedge clutch of claim 11, wherein the cage assembly includes a first washer disposed on one axial side of the plurality of wedge segments and connecting the plurality of pins annularly about the axis.

13. The wedge clutch of claim 12, wherein the cage assembly includes a second washer disposed on another axial side of the plurality of wedge segments and connecting the plurality of pins annularly about the axis.

14. The wedge clutch of claim 11, wherein each of the wedge segments includes an aperture for receiving one of the pins.

15. The wedge clutch of claim 14, wherein the apertures have an oblong profile and the pins have a cylindrical portion extending through the apertures such that relative movement of the apertures about the pins is enabled.

16. A clutch comprising:
    a first rotatable member rotatable about an axis and having an inner surface facing the axis;
    a second rotatable member rotatable about the axis and having an outer surface facing the inner surface of the first rotatable member, wherein one of the inner surface and the outer surface has a groove defined therein, and the other of the inner surface and the outer surface is a first tapered surface;
    a plurality of wedge segments separable from one another, each wedge segment having a second tapered surface in sliding engagement with the first tapered surface to cause radial movement of the wedge segments; and
    a cage assembly including a plurality of pins extending entirely through the wedge segments to guide radial movement of the wedge segments.

17. The clutch of claim 16, wherein each wedge segments defines an oblong aperture, and each pin is cylindrical and extends through one of the oblong apertures such that relative movement of the oblong apertures about the pins is enabled.

18. The clutch of claim 16, wherein the cage assembly includes first and second washers arranged about the axis and spaced from one another.

19. The clutch of claim 18, wherein each of the pins extends is fixed to the first and second washers.

20. The clutch of claim 18, wherein the cage assembly includes an annular wavy spring disposed about the axis and between the first and second washers, wherein the spring is configured to bias the wedge segments radially.

* * * * *